(12) United States Patent
Schediwy et al.

(10) Patent No.: US 9,841,850 B2
(45) Date of Patent: Dec. 12, 2017

(54) DEVICE AND METHOD FOR PROXIMITY SENSING WITH FORCE IMAGING

(71) Applicant: SYNAPTICS INCORPORATED, San Jose, CA (US)

(72) Inventors: Richard R. Schediwy, Union City, CA (US); Pascale El Kallassi, Menlo Park, CA (US)

(73) Assignee: Synaptics Incorporated, San Jose, CA (US)

( * ) Notice: Subject to any disclaimer, the term of this patent is extended or adjusted under 35 U.S.C. 154(b) by 31 days.

(21) Appl. No.: 14/305,840

(22) Filed: Jun. 16, 2014

(65) Prior Publication Data

US 2015/0363019 A1    Dec. 17, 2015

(51) Int. Cl.
*G06F 3/045* (2006.01)
*G06F 3/044* (2006.01)
*G06F 3/041* (2006.01)

(52) U.S. Cl.
CPC ............ *G06F 3/044* (2013.01); *G06F 3/0414* (2013.01); *G06F 2203/04105* (2013.01); *G06F 2203/04108* (2013.01); *G06F 2203/04111* (2013.01)

(58) Field of Classification Search
CPC ...... G06F 3/044; G06F 3/0412; G06F 3/0416; G06F 2203/04111; G06F 2203/04101; G06F 2203/04108; G06F 2203/04105; G06F 3/0414
See application file for complete search history.

(56) References Cited

U.S. PATENT DOCUMENTS

| | | | |
|---|---|---|---|
| 5,510,813 A | 4/1996 | Makinwa et al. | |
| 5,942,733 A | 8/1999 | Allen et al. | |
| 6,002,389 A | * 12/1999 | Kasser | G06F 3/041 178/18.01 |
| 7,154,481 B2 | 12/2006 | Cross et al. | |
| 7,395,717 B2 | 7/2008 | DeAngelis et al. | |
| 7,538,760 B2 | 5/2009 | Hotelling et al. | |
| 8,063,886 B2 | 11/2011 | Serban et al. | |
| 8,627,716 B2 | 1/2014 | Son | |
| 8,653,834 B2 | 2/2014 | Reynolds | |
| 9,354,731 B1 | * 5/2016 | Pance | G06F 3/0488 |
| 2001/0013855 A1 | 8/2001 | Fricker et al. | |
| 2004/0090429 A1 | 5/2004 | Geaghan et al. | |
| 2006/0260417 A1 | 11/2006 | Son et al. | |
| 2007/0229464 A1 | 10/2007 | Hotelling et al. | |
| 2007/0236466 A1 | 10/2007 | Hotelling | |

(Continued)

*Primary Examiner* — Patrick Edouard
*Assistant Examiner* — Joseph Fox
(74) *Attorney, Agent, or Firm* — Osha Liang LLP

(57) ABSTRACT

Methods, systems and devices are described for operating an electronic system which includes a pliable component having an input surface, a first array of sensor electrodes, a second array of sensor electrodes, and a third array of sensor electrodes. The input device also includes a conductive substrate spaced apart from the pliable component and a compliant component disposed between the pliable component and the conductive substrate. In response to pressure applied by an input object to the input surface, the pliable component and the first, second, and third arrays of sensor electrodes locally deform and the compliant component locally compresses such that a spacing between the conductive substrate and at least one electrode from each of the first, second, and third arrays decreases.

14 Claims, 4 Drawing Sheets

(56) References Cited

U.S. PATENT DOCUMENTS

| | | |
|---|---|---|
| 2008/0174321 A1 | 7/2008 | Kang et al. |
| 2009/0091551 A1 | 4/2009 | Hotelling et al. |
| 2009/0267916 A1 | 10/2009 | Hotelling |
| 2009/0314621 A1 | 12/2009 | Hotelling |
| 2010/0108409 A1* | 5/2010 | Tanaka ............... G06F 3/044 178/18.06 |
| 2010/0242629 A1 | 9/2010 | Leuenberger et al. |
| 2010/0253651 A1* | 10/2010 | Day ................... G06F 3/044 345/175 |
| 2010/0282000 A1 | 11/2010 | Gorjanc et al. |
| 2011/0175671 A1* | 7/2011 | Reynolds ......... H03K 17/962 327/517 |
| 2012/0013573 A1 | 1/2012 | Liu et al. |
| 2012/0026124 A1 | 2/2012 | Li et al. |
| 2012/0038583 A1* | 2/2012 | Westhues .......... G06F 3/0412 345/174 |
| 2012/0062245 A1 | 3/2012 | Bao et al. |
| 2012/0105367 A1 | 5/2012 | Son et al. |
| 2012/0206401 A1 | 8/2012 | Lin et al. |
| 2013/0021089 A1 | 1/2013 | Sakurai et al. |
| 2013/0076646 A1* | 3/2013 | Krah ................. G06F 3/0414 345/173 |
| 2013/0300695 A1* | 11/2013 | Cho .................... G06F 3/041 345/173 |
| 2014/0062933 A1* | 3/2014 | Coulson ............. G06F 3/044 345/174 |
| 2014/0085254 A1* | 3/2014 | Tenuta ............... G06F 3/0414 345/174 |
| 2014/0267128 A1* | 9/2014 | Bulea ................. G06F 3/044 345/174 |
| 2015/0130742 A1 | 5/2015 | Chen et al. |

* cited by examiner

__TITLE__: DEVICE AND METHOD FOR PROXIMITY SENSING WITH FORCE IMAGING

TECHNICAL FIELD

This invention generally relates to electronic devices, and more specifically relates to sensor devices and using sensor devices for producing user interface inputs.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

The proximity sensor device can be used to enable control of an associated electronic system. For example, proximity sensor devices are often used as input devices for larger computing systems, including: notebook computers and desktop computers. Proximity sensor devices are also often used in smaller systems, including: handheld systems such as personal digital assistants (PDAs), remote controls, and communication systems such as wireless telephones and text messaging systems. Increasingly, proximity sensor devices are used in media systems, such as CD, DVD, MP3, video or other media recorders or players. The proximity sensor device can be integral or peripheral to the computing system with which it interacts.

Some input devices also have the ability to detect applied force in the "Z" direction in addition to determining "X-Y" coordinate information for input objects interacting with a sensing region of the input device. However, in presently known force/proximity input devices the various touch and force electrodes are disposed on two or more substrates, thereby increasing the cost and complexity of presently known force enabled input devices. A proximity sensor with reduced manufacturing cost and complexity is thus needed.

BRIEF SUMMARY

Embodiments of the present invention provide a device and method that facilitates improved device usability. The device and method provide improved user interface functionality by strategically arranging both the touch sensing and force sensing electrodes on a single flexible substrate (or laminate), with a compliant component separating the substrate from a conductive layer. In response to applied force, the touch and force electrodes move towards the conductive layer, changing the capacitance between the force electrodes and the conductive layer in a detectable way. Other embodiments include an additional floating electrode layer disposed between the force electrodes and the conductive layer to enhance the variable capacitance and, hence, the pressure sensitivity, of the force sensing electrodes. Displaceable air gaps may also be disposed between the force pixels and the conductive substrate and configured to increase the electrical permittivity and, hence, the force response, of the force pixels responsive to applied pressure.

BRIEF DESCRIPTION OF DRAWINGS

The preferred exemplary embodiment of the present invention will hereinafter be described in conjunction with the appended drawings, where like designations denote like elements, and.

DETAILED DESCRIPTION

Figure 1:
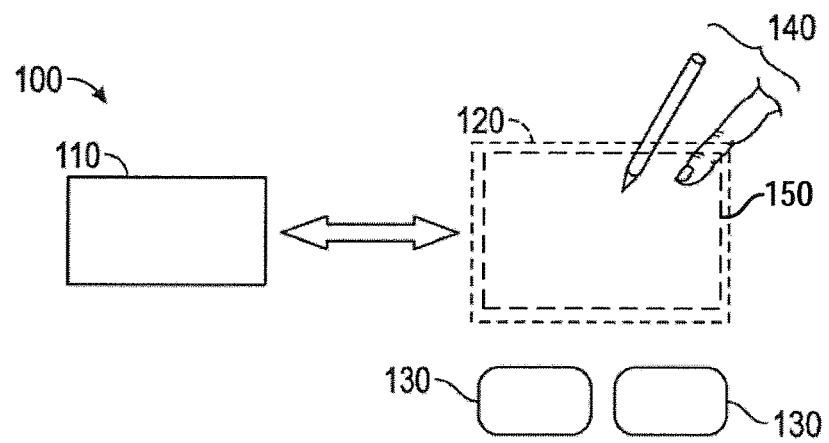
FIG. 1 is a block diagram of an exemplary electronic system that includes an input device and a processing system in accordance with an embodiment.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that facilitate simple construction, reduced cost, and enhanced force sensing capability resulting in improved usability. Device cost and complexity may be reduced by disposing three electrode arrays (touch receiver, force receiver, and common transmitter) on a single substrate or laminate. In response to applied pressure, the pliable electrode substrate deforms in the vicinity of the applied force, such that all three electrode arrays move without appreciable relative motion among the respective arrays. That is, the touch pixels and force pixels move in unison toward the conductive substrate to thereby facilitate force sensing between the force pixels and the conductive substrate, without compromising touch (position) sensing.

Force sensitivity may be facilitated by providing the input device with a compliant (e.g., elastomeric) layer locally compressible in the vicinity of applied force, reducing the distance between the force pixels and the conductive substrate, thereby affecting the variable capacitance between the force pixels and the conductive substrate. In addition to or in lieu of the aforementioned interaction between the force pixels and the conductive substrate, air gaps (e.g., formed by spacer dots or microstructures) may be configured to conform locally around the force pixels to thereby increase the dielectric constant (permittivity) proximate the force pixels in response to applied pressure. Specifically, as air is displaced from the volume surrounding or proximate the force pixels, the local dielectric constant becomes dominated by the relatively higher dielectric constant associated with the spacing structures and/or elastomer material which fills the displaced air volume. This change in dielectric constant facilitates enhanced force imaging in response applied pressure at the input surface.

In other embodiments, a floating electrode layer may be placed between the force pixels and the conductive substrate. In one embodiment, the floating layer comprises an array of ohmically isolated floating islands, each aligned overtop of a respective force pixel. In this way, the competing effects between the spacer dots (which tend to increase the variable capacitance associated with a force pixel in response to applied pressure), and the decreasing distance between the force pixels and the conductive substrate (which tends to decrease the variable capacitance associated with a force pixel in response to applied pressure), may be mitigated. In particular, a floating electrode overlying a force pixel effectively masks the electrical effects of the changing dielectric constant from the variable capacitance associated with the force pixel. Consequently, the addition of floating electrodes mitigates the foregoing competing behaviors, resulting in a larger change in variable capacitance of the force pixels responsive to applied pressure vis-a-vis the same stack up without floating electrodes.

Turning now to the figures, FIG. 1 is a block diagram of an exemplary input device 100 in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In a preferred embodiment, the input device 100 is implemented as a force enabled touchpad system including a processing system 110 and a sensing region 120. Sensing region 120 (also often referred to as "touchpad") is configured to sense input provided by one or more input objects 140 in the sensing region 120. Example input objects include fingers, thumb, palm, and styli. The sensing region 120 is illustrated schematically as a rectangle; however, it should be understood that the sensing region may be of any convenient form and in any desired arrangement on the surface of and/or otherwise integrated with the touchpad.

Sensing region 120 includes sensors for detecting force and proximity, as described in greater detail below in conjunction with FIG. 2. Sensing region 120 may encompass any space above (e.g., hovering), around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device is adapted to provide user interface functionality by facilitating data entry responsive to the position of sensed objects and the force applied by such objects. Specifically, the processing system is configured to determine positional information for objects sensed by a sensor in the sensing region. This positional information can then be used by the system to provide a wide range of user interface functionality. Furthermore, the processing system is configured to determine force information for objects from measures of force determined by the sensor in the sensing region. This force information can then also be used by the system to provide a wide range of user interface functionality, for example, by providing different user interface functions in response to different levels of applied force by objects in the sensing region. Furthermore, the processing system may be configured to determine input information for more than one object sensed in the sensing region. Input information can be based upon a combination the force information, the positional information, the number of input objects in the sensing region and/or in contact with the input surface, and a duration the one or more input objects is touching or in proximity to the input surface. Input information can then be used by the system to provide a wide range of user interface functionality.

The input device is sensitive to input by one or more input objects (e.g. fingers, styli, etc.), such as the position of an input object within the sensing region. The sensing region encompasses any space above, around, in and/or near the input device in which the input device is able to detect user input (e.g., user input provided by one or more input objects). The sizes, shapes, and locations of particular sensing regions may vary widely from embodiment to embodiment. In some embodiments, the sensing region extends from a surface of the input device in one or more directions into space until signal-to-noise ratios prevent sufficiently accurate object detection. The distance to which this sensing region extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device, contact with an input surface (e.g. a touch surface) of the input device, contact with an input surface of the input device coupled with some amount of applied force, and/or a combination thereof. In various embodiments, input surfaces may be provided by surfaces of casings within which the sensor electrodes reside, by face sheets applied over the sensor electrodes or any casings.

The input device 100 may utilize any combination of sensor components and sensing technologies to detect user input (e.g., force, proximity) in the sensing region 120 or otherwise associated with the touchpad. The input device 100 comprises one or more sensing elements for detecting user input. As several non-limiting examples, the input device 100 may use capacitive, resistive, inductive, magnetic, acoustic, ultrasonic, and/or optical techniques.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage is applied to create an electric field. Nearby input objects cause changes in the electric field, and produce detectable changes in capacitive coupling that may be detected as changes in voltage, charge, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

It should also be understood that the input device may be implemented with a variety of different methods to determine force imparted onto the input surface of the input device. For example, the input device may include mechanisms disposed proximate to the input surface and configured to provide an electrical signal representative of an absolute or a change in force applied onto the input surface. In some embodiments, the input device may be configured to determine force information based on a defection of the input surface relative to a stationary conductor (e.g. a display screen underlying the input surface). In some embodiments, the input surface may be configured to deflect about one or multiple axis. In some embodiments, the input surface may be configured to deflect in a substantially uniform or non-uniform manner.

In FIG. 1, a processing system 110 is shown as part of the input device 100. However, in other embodiments the processing system may be located in the host electronic device with which the touchpad operates. The processing system 110 is configured to operate the hardware of the input device 100 to detect various inputs from the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as graphical user interface (GUI) actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions. The types of actions may include, but are not limited to, pointing, tapping, selecting, clicking, double clicking, panning, zooming, and scrolling. Other examples of possible actions include an initiation and/or rate or speed of an action, such as a click, scroll, zoom, or pan.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information, particularly regarding the presence of an input object in the sensing region. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

Likewise, the term "force information" as used herein is intended to broadly encompass force information regardless of format. For example, the force information can be provided for each input object as a vector or scalar quantity. As another example, the force information can be provided as an indication that determined force has or has not crossed a threshold amount. As other examples, the force information can also include time history components used for gesture recognition. As will be described in greater detail below, positional information and force information from the processing systems may be used to facilitate a full range of interface inputs, including use of the proximity sensor device as a pointing device for selection, cursor control, scrolling, and other functions.

Likewise, the term "input information" as used herein is intended to broadly encompass temporal, positional and force information regardless of format, for any number of input objects. In some embodiments, input information may be determined for individual input objects. In other embodiments, input information comprises the number of input objects interacting with the input device.

In some embodiments, the input device 100 is implemented with additional input components that are operated by the processing system 110 or by some other processing system. These additional input components may provide redundant functionality for input in the sensing region 120, or some other functionality. For example, buttons 130 may be placed near the sensing region 120 and used to facilitate selection of items using the input device 102. Other types of additional input components include sliders, balls, wheels, switches, and the like. Conversely, in some embodiments, the input device 100 may be implemented with no other input components.

In some embodiments, the electronic system 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110. In some embodiments, the electronic system 100 comprises a touch screen interface, and the sensing region 120 overlaps at least part of an active area of a display screen 150, such as a flexible display screen.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

It should also be understood that the input device may be implemented with a variety of different methods to determine force imparted onto the input surface of the input device. For example, the input device may include mechanisms disposed proximate the input surface and configured to provide an electrical signal representative of an absolute or a change in force applied onto the input surface. In some embodiments, the input device may be configured to determine force information based on a defection of the input surface relative to a conductor (e.g. a display screen underlying the input surface). In some embodiments, the input surface may be configured to deflect about one or multiple axis. In some embodiments, the input surface may be configured to deflect in a substantially uniform or non-uniform manner.

As described above, in some embodiments some part of the electronic system processes information received from the processing system to determine input information and to act on user input, such as to facilitate a full range of actions. For example, in some embodiments, input information for an input object comprising, a force value F, a location X,Y and a time of contact T may result in a first action. While input information for an input object comprising a force value F', a location X',Y' and a time of contact T' (where the prime values are uniquely different from the non-prime values) may also result in the first action. Furthermore, input information for an input object comprising a force value F, a location X',Y and a time of contact T' may result in a first action. While the examples below describe actions which may be performed based on input information comprising a specific range of values for force, position and the like, it should be appreciated that that different input information (as described above) may result in the same action. Furthermore, the same type of user input may provide different functionality based on a component of the input information. For example, different values of F, X/Y and T may result in the same type of action (e.g. panning, zooming, etc.), that type of action may behave differently based upon said values or other values (e.g. zooming faster, panning slower, and the like).

As noted above, the embodiments of the invention can be implemented with a variety of different types and arrangements of capacitive sensor electrodes for detecting force and/or positional information. To name several examples, the input device can be implemented with electrode arrays that are formed on multiple substrate layers, typically with the electrodes for sensing in one direction (e.g., the "X" direction) formed on a first layer, while the electrodes for sensing in a second direction (e.g., the "Y" direction are formed on a second layer. In other embodiments, the sensor electrodes for both the X and Y sensing can be formed on the same layer. In yet other embodiments, the sensor electrodes can be arranged for sensing in only one direction, e.g., in either the X or the Y direction. In still another embodiment, the sensor electrodes can be arranged to provide positional information in polar coordinates, such as "r" and "θ" as one example. In these embodiments the sensor electrodes themselves are commonly arranged in a circle or other looped shape to provide "θ", with the shapes of individual sensor electrodes used to provide "r".

Also, a variety of different sensor electrode shapes can be used, including electrodes shaped as thin lines, rectangles, diamonds, wedge, etc. Finally, a variety of conductive materials and fabrication techniques can be used to form the sensor electrodes. As one example, the sensor electrodes are formed by the deposition of conductive ink on a substrate.

In some embodiments, the input device is comprises a sensor device configured to detect contact area and location of a user interacting with the device. The input sensor device may be further configured to detect positional information about the user, such as the position and movement of the hand and any fingers relative to an input surface (or sensing region) of the sensor device.

In some embodiments, the input device is used as an indirect interaction device. An indirect interaction device may control GUI actions on a display which is separate from the input device, for example a touchpad of a laptop computer. In one embodiment, the input device may operate as a direct interaction device. A direct interaction device controls GUI actions on a display which underlies a proximity sensor, for example a touch screen. There are various usability differences between indirect and direct more which may confuse or prevent full operation of the input device. For example, an indirect input device may be used to position a cursor over a button by moving an input object over a proximity sensor. This is done indirectly, as the motion of the input does not overlap the response on the display. In a similar case, a direct interaction device may be used to position a cursor over a button by placing an input object directly over or onto the desired button on a touch screen.

With continued reference to FIG. 1, the processing system 110 includes a sensor module and a determination module. The sensor module is configured to receive resulting signals from the sensors associated with sensing region 120. The determination module is configured to process the data, and to determine positional information and force information. The embodiments of the invention can be used to enable a variety of different capabilities on the host device. Specifically, it can be used to enable cursor positioning, scrolling, dragging, icon selection, closing windows on a desktop, putting a computer into sleep mode, or perform any other type of mode switch or interface action.

Figure 2:
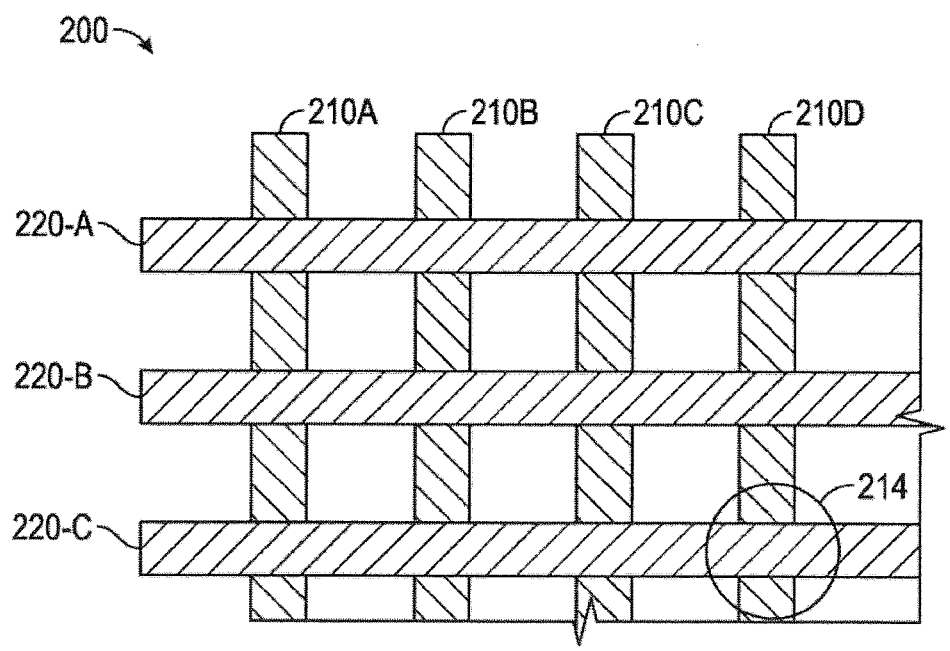
FIG. 2 is a schematic view of an exemplary electrode array illustrating touch sensor and/or force sensor pixels in accordance with an embodiment of the invention.

FIG. 2 shows a portion of a sensor electrode pattern configured to sense the position (or force) associated with objects proximate the pattern, according to some embodiments. For clarity of illustration and description, FIG. 2 shows a pattern (e.g., an array) 200 comprising a plurality of transmitter electrodes 220A-C and a plurality of receiver electrodes 210A-D defining an array of pixels 214. In the context of proximity sensing, the receiver electrodes 210 function as touch sensor electrodes, and the array of pixels 214 produces a touch image representing positional information for the input objects. In the context of force sensing, the receiver electrodes 210 function as force sensor electrodes, and the array of pixels 214 produces a force image representing force information for the input objects.

Transmitter electrodes 220 and receiver electrodes 210 are typically ohmically isolated from each other. That is, one or more insulators separate the transmitter electrodes from the receiver electrodes and prevent them from electrically shorting to each other. In some embodiments, receiver electrodes 210 and transmitter electrodes 220 are separated by insulative material disposed between them at cross-over areas; in such constructions, the electrode junctions (or pixels) may be formed with jumpers connecting different portions of the same electrode. In some embodiments, the transmitter and receiver electrodes are separated by one or more layers of insulative material. In some other embodiments, the transmitter and receiver electrodes are separated by one or more substrates; for example, they may be disposed on opposite sides of the same substrate, or on different substrates that are laminated together. Moreover, one or more of the sensor electrodes can be used for both capacitive sensing and for updating the display. Alternatively, the sensor electrodes may be implemented in a single layer design where the sensor electrodes do not overlap in the sensing region.

Figure 3:
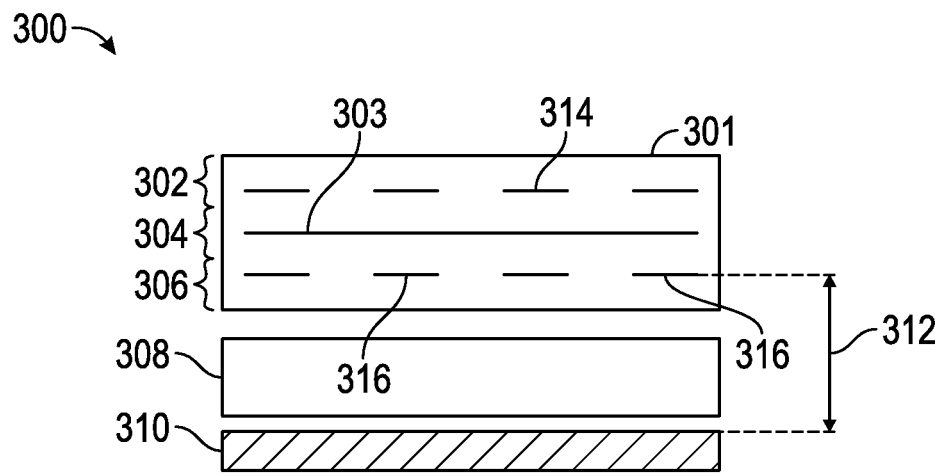
FIG. 3 is a schematic cross section view of an input sensor stack-up including a pliable electrode layer, a conductive substrate, and a compliant component disposed therebetween in accordance with an embodiment.

Referring now to FIG. 3, an input device 300 includes a pliable electrode layer 301, a compressible or compliant layer 308 (e.g., elastomeric silicone), and a conductive substrate 310. The electrode layer 301 includes respective first, second, and third arrays 302, 304, and 306 of sensing electrodes. In the illustrated embodiment, the first array 302 comprises a plurality of touch receiver electrodes 314, the second array 304 comprises a plurality of transmitter electrodes 303, and the third array 306 comprises a plurality of force receiver electrodes 316. It will be appreciated that each touch receiver electrode 314 may be capacitively coupled to each transmitter electrode to form a touch pixel, and that each force receiver electrode 316 may be capacitively coupled to each transmitter electrode to form a force pixel. In this context, a touch image may comprise a plurality of respective touch pixels 314, and a force image may comprise a plurality of respective force pixels 316.

Figure 4:
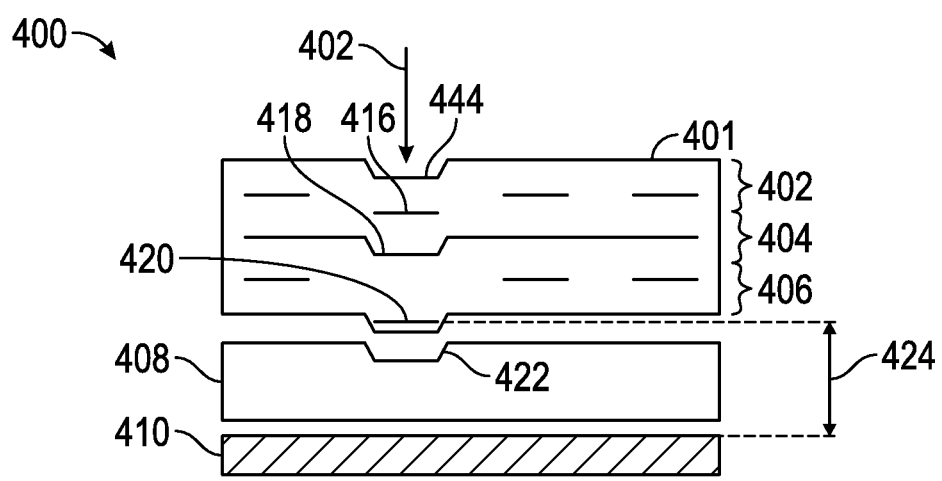
FIG. 4 is a schematic cross section view of the input sensor stack-up of FIG. 3, showing local deformation of the electrode layer and local compression of the compliant component in response to applied pressure in accordance with an embodiment.

Referring now to FIGS. 3 and 4, the variable capacitance associated with each force pixel 316 changes as the distance between the force pixel and the conductive substrate 310 changes due to applied pressure. For example, in the absence of applied pressure (FIG. 3), an each force pixel 316 is disposed a distance 312 from the conductive substrate 310. In response to pressure applied by an input object 402 (FIG. 4), the distance between a force pixel and the conductive substrate changes in the vicinity of the input object.

More particularly, FIG. 4 illustrates an input device 400 including a pliable electrode layer 401, a compliant component 408, and a conductive substrate 410. The pliable component 401 includes respective first, second, and third arrays 402, 404, and 406 of sensing electrodes. In the illustrated embodiment, the first array 402 comprises a plurality of touch receiver electrodes, the second array 404 comprises a plurality of transmitter electrodes, and the third array 406 comprises a plurality of force receiver electrodes. In response to applied pressure, the pliable component 401 and the first, second, and third arrays 402-406 locally deform in a region 444 proximate the input object 402, and the compliant component 408 locally compresses in a region 422 proximate the input object 402. Consequently, the spacing (distance) between the conductive substrate and at least one of the arrays 402-406 decreases.

In the illustrated embodiment, the three arrays 402-406 move together (e.g., as a single system), such that the spacing between and among the arrays does not appreciably change in response to applied pressure. As a result, a distance 424 between a force pixel 420 (in region 422) and the conductive substrate 410 decreases in response to applied pressure, causing a measurable change in variable capacitance of the force pixel indicative of the magnitude of the applied pressure. It should also be noted that the distance between the conductive substrate 410 and each of a touch pixel 416 and a transmitter electrode 420 similarly decreases in response to applied pressure.

Figure 5:
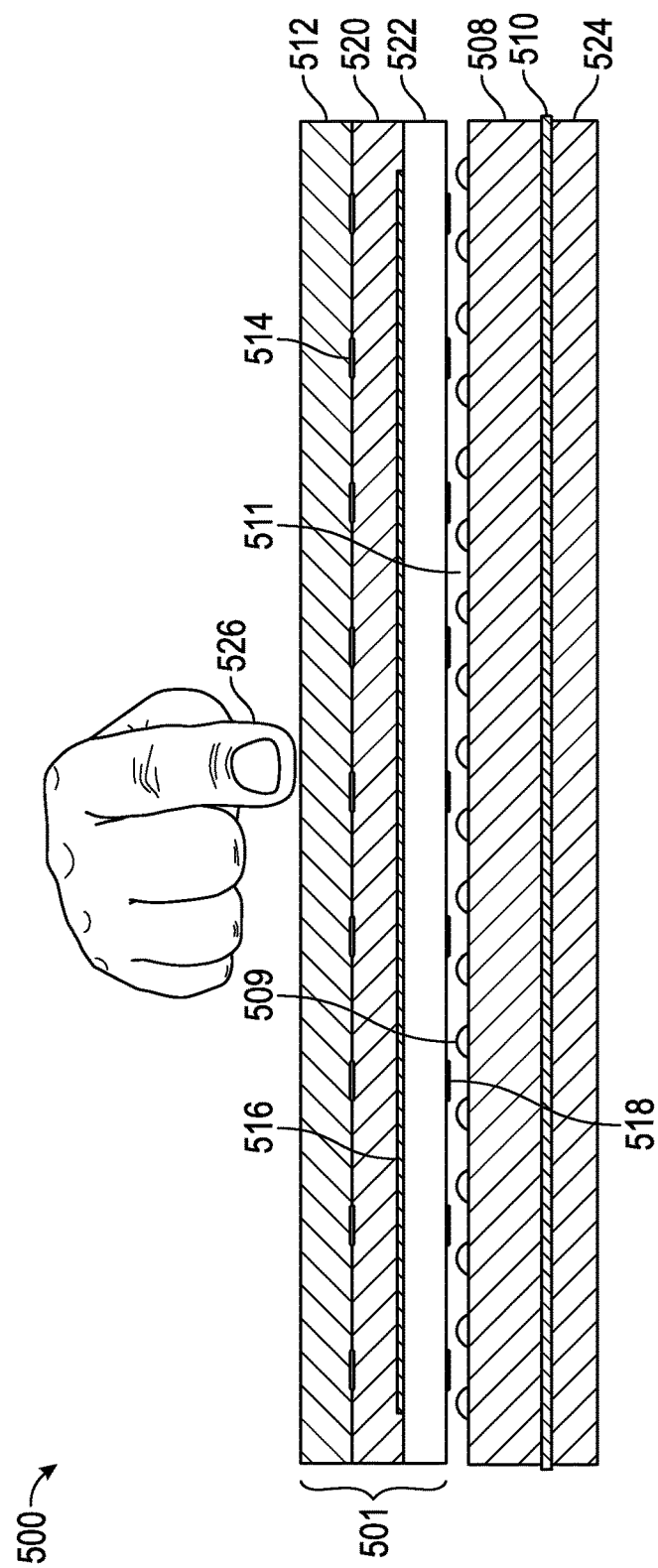
FIG. 5 is a schematic cross section view of an input sensor stack-up including a pliable electrode laminate layer including force pixels and bearing a flexible facesheet, a conductive layer opposing the electrode layer, and an elastomer layer having spacer dots disposed therebetween in accordance with an embodiment.

FIG. 5 is a schematic cross section view of an input sensor stack-up 500 including a pliable layer 501, a conductive layer 510 opposing the pliable layer 501, and an elastomer layer 508 having a plurality of spacer dots 509 disposed between the pliable layer 501 and the conductive layer 510. The pliable layer 501 may comprise a single substrate or a laminate configured to respond to input force as a single layer; that is, the pliable layer locally deforms in response to applied pressure such that the relative distance between the various electrode arrays remains substantially constant.

The pliable layer 501 includes a flexible facesheet 512, a first array of touch pixels 514, a second array of transmitter electrodes 516, and a third array of force pixels 518. In the illustrated embodiment, the first and second arrays are disposed on opposite sides of a flexible (e.g., polyethylene terephthalate or PET) substrate 520, and the third array is disposed on a dielectric layer 522 adjacent to the substrate 520. In an embodiment, the conductive substrate 510 may be a continuous sheet electrode supported on a rigid substrate 524. In various embodiments, the conductive substrate is maintained at a constant potential, for example, at a local or system ground.

In response to applied pressure by an input object 526 (e.g., finger, non-conductive or conductive stylus), one or more force pixels 518 in the vicinity of the applied force locally deform and move closer to the conductive substrate 510, thereby changing the measurable variable capacitance associated with the one or more force pixels.

The embodiment shown in FIG. 5 also includes a plurality of spacer dots 509 or other microstructures which include air gaps 511 in the volume surrounding or otherwise proximate the force pixels. In response to applied pressure, air is evacuated from the local volume surrounding one or more force pixels, and is replaced by the elastomeric material 508 and/or pliable component 501, which may be characterized by a dielectric constant greater than that of air. Consequently, the variable capacitance associated with force pixels in the region of applied pressure changes in a measurable way. Those skilled in the art will appreciate, however, that that the variable capacitance (▲C) tends to increase as a higher dielectric material displaces air, whereas ▲C tends to decrease as a force pixel moves closer to the conductive substrate. Accordingly, the use of spacer dots may be more appropriate in the absence of a conductive substrate. Alternatively, the electrical effects of spacer dots may be mitigated by an additional layer of floating electrodes, as discussed below in connection with FIG. 6.

Figure 6:
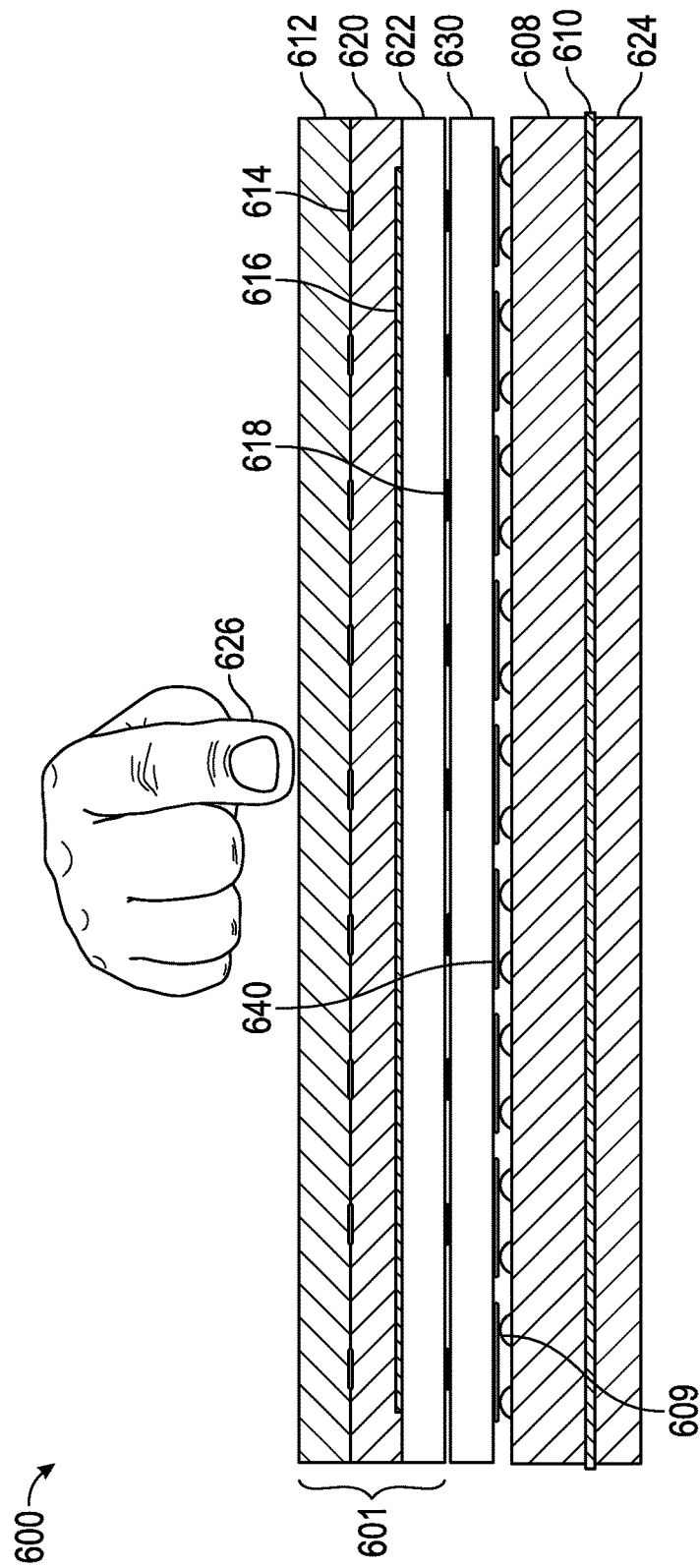
FIG. 6 is a schematic cross section view of the stack-up of FIG. 5, further including a floating electrode layer overlying the force pixels in accordance with an embodiment.

FIG. 6 is a schematic cross section view of an input sensor stack-up 600 including a pliable layer 601, a conductive layer 610 opposing the pliable layer 601, and a compliant component (elastomer layer) 608 having a plurality of spacer dots 609 disposed between the pliable layer 601 and the conductive layer 610. The pliable layer 601 may comprise a single substrate or a laminate as described above in conjunction with FIG. 5. In an embodiment, the conductive layer 610 may be a continuous sheet electrode supported on a rigid substrate 624. Element 624 in FIG. 6 is analogous to element 524 in FIG. 5.

The pliable layer 601 includes a flexible facesheet 612, a first array of electrodes 614, a second array of electrodes 616, and a third array of electrodes 618. In the illustrated embodiment, the first and second arrays are disposed on opposite sides of a flexible (e.g., polyethylene terephthalate or PET) substrate 620, and the third array is disposed on a first dielectric layer 622 adjacent to the substrate 620. However, in some embodiments, the first array of sensor electrodes 614 may be disposed on a side of the flexible face sheet 612. In an embodiment, the first electrode array 614 comprises an array of touch receiver electrodes, the third array 616 comprises an array of force receiver electrodes, and the second array 614 comprises an array of transmitter electrodes. Thus, the electrodes of the second array 616 form a variable capacitance with the electrodes of the third array 616 to form an array of force pixels (See FIG. 2).

In response to applied pressure by an input object 626, the pliable layer 601 locally deforms, causing one or more sensor electrodes of the third array 618 (in the vicinity of the applied force) to locally deform and move closer to the conductive substrate 610, thereby decreasing the measurable variable capacitance associated with the one or more force pixels.

At the same time, the measurable capacitance tends to increase as the higher dielectric spacer material displaces air near the affected force pixels. To counteract the electrical effect of the spacer dots, a plurality of floating electrodes 640 may be interposed between the force pixels 618 and the conductive substrate 610. In particular, the floating electrode layer may comprise an array of ohmically isolated floating islands each disposed overtop a respective force pixel 618. In the illustrated embodiment, the floating electrode layer is part of the pliable layer 601, being separated therefrom by a second dielectric layer 630. The presence of the floating electrodes 640 essentially masks or mitigates the electrical effects of the change in dielectric, while facilitating the decrease in the measurable ▲C associated with the force pixels in the vicinity of applied pressure.

An input device for an electronic system is thus provided which includes a pliable component having an input surface, a first array of sensor electrodes, a second array of sensor electrodes, and a third array of sensor electrodes; a conductive substrate spaced apart from the pliable component; and a compliant component disposed between the pliable component and the conductive substrate; wherein, in response to pressure applied by an input object to the input surface, the pliable component and the first, second, and third arrays of sensor electrodes locally deform and the compliant component locally compresses such that a spacing between the conductive substrate and at least one electrode from each of the first, second, and third arrays, respectively, decreases.

In an embodiment, the conductive substrate comprises a surface maintained at a substantially constant electrical potential such as, for example, a local or chassis ground potential.

In an embodiment, the input device further includes a processing system communicatively coupled to the first, second, and third arrays of sensor electrodes and configured to: transmit a sensing signal onto at least a subset of the second array of sensor electrodes; receive, from at least a subset of the first array of sensor electrodes, a first resulting signal comprising effects of input object presence proximate the input surface; and receive, from at least a subset of the third array of sensor electrodes, a second resulting signal comprising effects of force from an input object on the input surface.

In an embodiment, the effects of force comprise a change in a variable capacitance formed between at least one of: the subset of electrodes in the second array and the subset of electrodes in the third array; and the subset of electrodes in the third array and the conductive substrate.

In an embodiment, the first and second resulting signals correspond to a single transmitted signal.

In an embodiment, the processing system is further configured to determine input object position from at least the first resulting signal and input object force from the second resulting signal.

In an embodiment, the compliant component comprises a locally compressible elastomeric substrate.

In an embodiment, the input device further includes an array of raised structures, wherein the array of raised structures is disposed on at least one of: the elastomeric substrate and extend toward the pliable component; and the pliable component and extend towards the elastomeric substrate.

In an embodiment, the array of raised structures includes a gas disposed in the volume surrounding the array of raised structures such that, in response to an input object applying pressure to the input surface, at least one of the elastomeric substrate and the pliable component is configured to deform into a region of the volume, locally displacing at least a portion of the gas and thereby increasing the effective dielectric constant associated with the region.

In an embodiment, the first and third arrays of sensor electrodes are oriented in a first direction and the second array of sensor electrodes and is oriented in a second direction substantially orthogonal to the first direction, and wherein the electrodes of the first array substantially overlap the electrodes of the third array.

In an embodiment, the input further includes a flexible display disposed between one of: the first array and the second array; the second array and the third array; and the third array and the compliant component.

In an embodiment, the first array and the second array are disposed on opposite sides of the pliable component, and the third array is disposed on a first insulating layer coupled to the pliable component. In some embodiments, the flexible display may be disposed below the first and second array, but above the third array of sensor electrodes and may further include a fourth array of sensor electrodes configured to capacitive couple with the third array of electrodes to form a plurality of force pixels. In some embodiments a plurality of floating electrodes and a conductive substrate/ sheet may also be used.

In an embodiment, the input device further includes a fourth array of floating electrodes interposed between the third array of sensor electrodes and the conductive substrate.

In an embodiment, the second and third arrays overlap to form a plurality of force pixels, and further wherein each floating electrode of the fourth array is disposed beneath a respective force pixel.

In an embodiment, the fourth array of floating electrodes is disposed on at least one of: a bottom surface of the pliable component and separated from the third array by a second insulating layer; and a top surface of the compliant component.

In an embodiment, the input device further includes a processing system communicatively coupled to the first, second, and third arrays of sensor electrodes and configured to: transmit, onto at least a subset of the second array of sensor electrodes, a sensing signal; receive, from at least a subset of the first array of sensor electrodes, a first resulting signal comprising effects of input object presence proximate the input surface; and receive, from at least a subset of the third array of sensor electrodes, a second resulting signal comprising effects of force from an input object on the input surface; wherein the effects of force comprise a change in a variable capacitance formed between a floating electrode and at least one of: i) the subset of the third array of sensor electrodes; and ii) the conductive substrate.

An input device is also provided which includes: a pliable component having an input surface, a first array of touch receiver electrodes, a second array of transmitter electrodes, and a third array of force receiver electrodes; a substantially constant potential conductive substrate spaced apart from the pliable component; and a compressible elastomeric substrate disposed between the pliable component and the conductive substrate; wherein, in response to force applied by an input object on the input surface, the pliable component locally deforms and the elastomeric substrate locally compresses such that relative positions of the first, second, and third arrays remain substantially constant.

In an embodiment, the input device further includes a processing system configured to: receive, from at least a subset of the first array of sensor electrodes, a first resulting signal comprising effects of input object presence proximate the input surface; receive, from at least a subset of the third array of sensor electrodes, a second resulting signal comprising effects of force from an input object on the input surface; and determine input object position from at least the first resulting signal and input object force from the second resulting signal.

In an embodiment, the second and third arrays overlap to form a plurality of force pixels, the input device further comprising a plurality of floating electrodes, each disposed between a respective one of the force pixels and the conductive substrate.

A processing system is also provided for use with an input device of the type including: i) a pliable component having an input surface, a first array of touch receiver electrodes, a second array of transmitter electrodes, and a third array of force receiver electrodes; ii) a constant potential conductive substrate spaced apart from the pliable component; and iii) a compressible elastomeric substrate disposed between the pliable component and the conductive substrate such that, in response to force applied by an input object on the input surface, the pliable component locally deforms and the elastomeric substrate locally compresses causing a spacing between the conductive substrate and at least one electrode from each of the first, second, and third arrays, respectively, to decrease. The processing system is communicatively coupled to the first, second, and third arrays and is configured to: receive a first resulting signal from the first array, the first resulting signal comprising effects of input object presence proximate the input surface; receive a second resulting signal from the second array, the second resulting signal comprising effects of force from an input object on the input surface; and determine input object position from at least the first resulting signal and input object force from the second resulting signal.

In an embodiment, the input device further includes a flexible display, and the processing system is further configured to update the flexible display using at least one of the first and second arrays. In some embodiments, the flexible display may be disposed below the first and second array, but above the third array of sensor electrodes and may further include a fourth array of sensor electrodes configured to capacitive couple with the third array of electrodes to form a plurality of force pixels. In some embodiments a plurality of floating electrodes and a conductive substrate/sheet may also be used Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Other embodiments, uses, and advantages of the invention will be apparent to those skilled in art from the specification and the practice of the disclosed invention.

What is claimed is:

1. An input device for an electronic system, comprising:
 a pliable component comprising:
  an input surface;
  a plurality of transmitter electrodes;
  a plurality of touch receiver electrodes above the plurality of transmitter electrodes;
  a plurality of force receiver electrodes below the plurality of transmitter electrodes; and
  a floating electrode below at least one of the plurality of force receiver electrodes;
 a conductive substrate spaced apart from the pliable component; and
 a compliant component comprising a plurality of air gaps and disposed between the pliable component and the conductive substrate,
 wherein the pliable component locally deforms in response to a force applied by an input object to the input surface,
 wherein the force pushes the floating electrode towards the conductive substrate decreasing a spacing between the conductive substrate and the floating electrode, and
 wherein the force displaces gas in the plurality of air gaps increasing the effective dielectric constant associated with the region between the floating electrode and the conductive substrate; and
 a processing system communicatively coupled to the first plurality of transmitter electrodes, the plurality of touch receiver electrodes, and the plurality of force receiver electrodes and configured to:
  transmit a sensing signal onto a subset of the plurality of transmitter electrodes;
  receive, from a subset of the plurality of touch electrodes, a first resulting signal comprising capacitive effects of input object presence proximate the input surface; and
  receive, from a subset of the plurality of force receiver electrodes, a second resulting signal comprising capacitive effects of both the increased effective dielectric constant and the decreased space between the floating electrode and the conductive substrate,
  wherein the first and second resulting signals are both based at least on the sensing signal transmitted onto the subset of the plurality of transmitter electrodes.

2. The input device of claim 1, wherein the conductive substrate comprises a surface maintained at a substantially constant electrical potential.

3. The input device of claim 1, wherein the force changes a variable capacitance formed between at least one selected from a group consisting of:
 the subset of the plurality of transmitter electrodes and the subset of the plurality of force receiver electrodes; and
 the subset of the plurality of force receiver electrodes and the conductive substrate.

4. The input device of claim 1, wherein the processing system is further configured to determine input object position from at least the first resulting signal and the force from the second resulting signal.

5. The input device of claim 1, wherein each of the plurality of raised structures is a spacer dot.

6. The input device of claim 1, wherein the plurality of touch receiver electrodes and the plurality of force receiver electrodes are oriented in a first direction, wherein the plurality of transmitter electrodes is oriented in a second direction substantially orthogonal to the first direction, and wherein the plurality of touch receiver electrodes substantially overlap the plurality of force receiver electrodes.

7. The input device of claim 1, further comprising a flexible display disposed between at least one selected from a group consisting of:

the plurality of touch receiver electrodes and the plurality of transmitter electrodes;

the plurality of transmitter electrodes and the plurality of force receiver electrodes; and the plurality of force receiver electrodes and the compliant component.

8. The input device of claim 1, wherein the pliable component further comprises a substrate and a first dielectric layer, wherein the plurality of touch receiver electrodes and the plurality of transmitter electrodes are disposed on opposite sides of the substrate, and the plurality of force receiver electrodes is disposed on the first dielectric layer.

9. The input device of claim 8, wherein the pliable component further comprises a second dielectric layer, and wherein the floating electrode is disposed on a bottom surface of the second dielectric layer.

10. The input device of claim 1, wherein the plurality of transmitter electrodes and the plurality of force receiver electrodes overlap to form a plurality of force pixels.

11. The input device of claim 1, wherein the compliant layer further comprises:

an elastomer layer; and a plurality of raised structures disposed on the elastomer layer that extend towards the floating electrode, wherein the plurality of air gaps are located between the raised structures.

12. An input device comprising:

a pliable component having an input surface, a first array of touch receiver electrodes, a second array of transmitter electrodes, a third array of force receiver electrodes, and a fourth array of floating electrodes;

a substantially constant potential conductive substrate spaced apart from the pliable component;

a compressible elastomer layer disposed between the pliable component and the conductive substrate, wherein the compressible elastomer layer locally compresses in response to a force applied by an input object on the input surface, increasing the effective dielectric constant in the region between the fourth array of floating electrodes and the conductive substrate, wherein the pliable component locally deforms in response to the force such that relative positions of the first, second, and third arrays remain substantially constant, wherein the fourth array of floating electrodes moves towards the conductive substrate in response to the force, decreasing a distance between the fourth array and the conductive substrate; and a processing system configured to:

receive, from a subset of the first array of touch receiver electrodes, a first resulting signal comprising capacitive effects of input object presence proximate the input surface;

receive, from a subset of the third array of force receiver electrodes, a second resulting signal comprising capacitive effects of the increased dielectric constant and the decreased distance between the fourth array of floating electrodes and the conductive substrate; and determine input object position from at least the first resulting signal and the force from the second resulting signal, wherein the first and second resulting signals are both based at least on a sensing signal transmitted onto a subset of the second array of sensor electrodes.

13. A processing system for use with an input device comprising: i) a pliable component having an input surface, a first array of touch receiver electrodes, a second array of transmitter electrodes, a third array of force receiver electrodes, and a fourth array of floating electrodes; ii) a constant potential conductive substrate spaced apart from the pliable component; and iii) a compressible elastomer layer disposed between the pliable component and the conductive substrate such that, in response to a force applied by an input object on the input surface, the pliable component locally deforms and the elastomer layer locally compresses causing a spacing between the conductive substrate and at least one electrode from the fourth array to decrease and the effective dielectric constant in the region between the fourth array of floating electrodes and the conductive substrate to increase, the processing system communicatively coupled to the first, second, and third arrays and configured to:

transmit a sensing signal on at least one electrode of the second array of sensor electrodes;

receive a first resulting signal from the first array, the first resulting signal comprising capacitive effects of input object presence proximate the input surface;

receive a second resulting signal from the third array, the second resulting signal comprising capacitive effects of the decrease in the spacing and the increase in the dielectric constant; and determine input object position from at least the first resulting signal and the force from the second resulting signal, wherein the first and second resulting signals are both based at least on the sensing signal transmitted onto the at least one electrode of the second array of sensor electrodes.

14. The processing system of claim 13, wherein:

the input device further includes a flexible display; and the processing system is further configured to update the flexible display using at least one of the first and second arrays.

* * * * *